(12) United States Patent
Baker (10) Patent No.: US 10,981,058 B2
(45) Date of Patent: Apr. 20, 2021

(54) METHOD AND APPARATUS FOR PROVIDING A COMPUTER IMPLEMENTED GAME

(71) Applicant: KING.COM LIMITED, St. Julians (MT)

(72) Inventor: Mathew Baker, London (GB)

(73) Assignee: KING.COM LTD., St. Julians (MT)

(*) Notice: Subject to any disclaimer, the term of this patent is extended or adjusted under 35 U.S.C. 154(b) by 0 days.

(21) Appl. No.: 15/608,423

(22) Filed: May 30, 2017

(65) Prior Publication Data

US 2018/0345143 A1 Dec. 6, 2018

(51) Int. Cl.
| | | |
|---|---|---|
| *A63F 13/52* | (2014.01) | |
| *A63F 13/20* | (2014.01) | |
| *A63F 13/44* | (2014.01) | |
| *A63F 13/25* | (2014.01) | |
| *A63F 13/45* | (2014.01) | |
| *A63F 13/80* | (2014.01) | |
| *A63F 13/533* | (2014.01) | |
| *A63F 13/92* | (2014.01) | |

(52) U.S. Cl.
CPC ............. *A63F 13/52* (2014.09); *A63F 13/20* (2014.09); *A63F 13/25* (2014.09); *A63F 13/44* (2014.09); *A63F 13/45* (2014.09); *A63F 13/533* (2014.09); *A63F 13/80* (2014.09); *A63F 13/92* (2014.09)

(58) Field of Classification Search
CPC .......... A63F 13/52; A63F 13/20; A63F 13/25; A63F 13/44
See application file for complete search history.

(56) References Cited

U.S. PATENT DOCUMENTS

2003/0008696 A1* 1/2003 Abecassis ............... A63F 13/10
  463/9
2013/0217489 A1* 8/2013 Bronstein Bendayan ...................
  A63F 13/12
  463/31

OTHER PUBLICATIONS

SimCity Purists Are Understandably Upset About the Newest SimCity.pdf, https://kotaku.com/sinncity-purists-are-understandably-upset-with-the-newes-1675386956, published on Dec. 26, 2014, last accessed on Aug. 22, 2019.*
FarmVille2, FarmVille 2 Country Escape Basic Gameplay Guide—FarmVille 2.pdf, https://zyngablog.typepad.conn/farmville_2/2014/04/country-escape-basic-gameplay-guide.html, published on Apr. 17, 2014 (Year: 2014).*
FarmVille2, https://www.youtube.conn/watch?v=roaBD3v4PUc&t=338s, published on Mar 22, 2014, related screen shots in screenFarnnVille2.pdf (Year: 2014).*
FarmVille2, Maries Order Board and Workshop Upgrades!—FarmVille 2.pdf, https://zyngablog.typepad.conn/farmville_2/2016/06/maries-order-board-and-workshop-upgrades.html, published on Jun. 30, 2016 (Year: 2016).*

* cited by examiner

Primary Examiner — Yingchuan Zhang
(74) Attorney, Agent, or Firm — Saul Ewing Arnstein & Lehr LLP (57) ABSTRACT

A computer implemented method comprises display of a navigable image on a display. The navigable image comprises a plurality of game objects. Game resources are associated with at least one of said game objects. A given amount of game resources are provided in a respective time period. The providing of the game resources can be speeded up if a computer game is played and an objective associated with the game achieved.

25 Claims, 9 Drawing Sheets

METHOD AND APPARATUS FOR PROVIDING A COMPUTER IMPLEMENTED GAME

FIELD OF THE INVENTION

Embodiments of this application relate to a user device for use in playing a computer implemented game.

Some embodiments may relate to engaging users or players in a computer game executable in an online environment.

BACKGROUND OF THE INVENTION

So-called casual games are a genre of games which have become very popular. However there are many technical challenges associated with such games.

One technical challenge is how to retain casual game play where a user is able to play a game as and when they like while at the same time having an aspect which involves interaction with other players.

Another technical challenge relates to how to keep players interested whilst using limited resources of a device on which a game is being played. This may be a particular challenge in the context of a so-called resource collection game.

This patent specification describes not only various ideas and functions, but also their creative expression. A portion of the disclosure of this patent document therefore contains material to which a claim for copyright is made and notice is hereby given: Copyright King.com Limited 2017 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer implemented method performed by a computer device to provide a computer implemented game, the computer device having at least one processor, at least one memory, a display, and a user interface, the method comprising: causing, by said at least one processor, display of a navigable image on said display, said navigable image comprising a plurality of game objects; generating, by said at least one processor, game resources associated with at least one of said game objects, wherein a given amount of said game resources are provided in a respective time period defined by a timer; detecting first user input, via the user interface, interacting with one of said game objects; causing by said at least one processor, in response to said detected first user input, display on said display of a game area, said game area allowing a first game within said computer executable game to be played; detecting second user input, via the user interface, interacting with said game area to play said first game; and responsive to said second user input, determining by said at least one processor if a game objective associated with said first game has been satisfied and if so causing a reduction in the respective time period required to provide said given amount of game resources.

In some embodiments, when it is determined that said game objective associated with said first game has been satisfied, the method may comprise causing the given amount of game resources to be provided and resetting of said timer.

The method may comprise causing, by the at least one processor, a game board to be displayed in said game area, said game board comprising a plurality of game elements selectable via said user interface.

The method may comprise detecting third user input via the user interface to select an upgrade mode associated with one of said game objects.

The method may comprise in response to said detected third user input causing by the at least one processor a game board to be displayed by said display, said game board comprising a plurality of game elements selectable via said user interface.

The method may comprise detecting fourth user input via said user interface to select one or more of said game elements to play a game associated with said game board, and responsive to said fourth user input determining by said processor if a game objective associated with said game board has been satisfied and if so upgrading said game object.

When said game object has been upgraded, the respective time period to produce the respective amount of resources is reduced.

When said game object has been upgraded, the respective amount of resources produced in said respective time period is increased.

At least one game object may have a plurality of different levels, each level being associated with a respective time to produce a respective amount of resources, at least one of the respective time period and the respective amount of resources being dependent on the level.

The timer may be one of a count up and a countdown timer.

The method may comprise determining by said at least one processor if a limit amount of said resources are waiting for collection during game play and if so, waiting until an amount of resources waiting for collection is less than the limit amount before causing, by the at least one processor, the generation of more of said resources.

When a game objective associated with said first game has been not been satisfied, then the timer may continue to run until said timer expires or said game objective associated with said first game has been satisfied.

According to an aspect, there is provided a computer device providing a computer implemented game, said device having: at least one processor; at least one memory; a display; and a user interface, wherein said at least one processor is configured to: cause, display of a navigable image on said display, said navigable image comprising a plurality of game objects; generate game resources associated with at least one of said game objects, wherein a given amount of said game resources are provided in a respective time period defined by a timer; detect first user input, via the user interface, interacting with one of said game objects; cause, in response to said detected first user input, display on said display of a game area, said game area allowing a first game within said computer executable game to be played; detect second user input, via the user interface, interacting with said game area to play said first game; and responsive to said second user input, determine if a game objective associated with said first game has been satisfied and if so cause a reduction in the respective time period required to provide said given amount of game resources.

The at least one processor may be configured, when it is determined that said game objective associated with said first game has been satisfied, to cause the given amount of game resources to be provided and resetting of said timer.

The at least one processor may be configured to cause a game board to be displayed in said game area, said game board comprising a plurality of game elements selectable via said user interface.

The at least one processor may be configured, to detect third user input via the user interface to select an upgrade mode associated with one of said game objects.

The at least one processor may be configured, in response to said detected third user input, to cause a game board to be displayed by said display, said game board comprising a plurality of game elements selectable via said user interface.

The at least one processor may be configured to detect fourth user input via said user interface to select one or more of said game elements to play a game associated with said game board, and responsive to said fourth user input determine if a game objective associated with said game board has been satisfied and if so upgrading said game object.

When said game object has been upgraded, the respective time period to produce the respective amount of resources may be reduced.

When said game object has been upgraded, the respective amount of resources produced in said respective time period may be increased.

At least one game object may have a plurality of different levels, each level being associated with a respective time period to produce a respective amount of resources, at least one of the respective time period and the respective amount of resources being dependent on the level.

The timer may be one of a count up and a countdown timer.

The at least one processor may be configured to determine if a limit amount of said resources are waiting for collection during game play and if so, waiting until an amount of resources waiting for collection is less than the limit amount before causing the generation of more of said resources.

When a game objective associated with said first game has been not been satisfied, then the timer may continue to run until said timer expires or said game objective associated with said first game has been satisfied.

According to another aspect, there is provided a non-transitory computer readable storage device storing instructions that, when executed by at least one processor of a computer device causes said at least one processor to perform the following steps: causing display of a navigable image on said display, said navigable image comprising a plurality of game objects; generating game resources associated with at least one of said game objects, wherein a given amount of said game resources are provided in a respective time period defined by a timer; detecting first user input, via the user interface, interacting with one of said game objects; causing in response to said detected first user input, display on said display of a game area, said game area allowing a first game within said computer executable game to be played; detecting second user input, via the user interface, interacting with said game area to play said first game; and responsive to said second user input, determining if game objective associated with said first game has been satisfied and if so causing a reduction in the respective time period required to provide said given amount of game resources.

The non-transitory computer readable storage device may store instructions that, when executed by the at least one processor cause, when it is determined that said game objective associated with said first game has been satisfied, cause the given amount of game resources to be provided and resetting of said timer.

According to another aspect, there is provided a computer implemented method performed by a computer device to provide a computer implemented game, the computer device having at least one processor, at least one memory, a display, and a user interface, the method comprising: causing by said at least one processor display on said display of a game board, said game board comprising a least one game object of a first type and a plurality of game objects of a second type, said game objects of said second type having one of a plurality of different available characteristics; detecting first user input via the user interface when a user engages with one of said game objects; determining by said at least one processor in response to said detected first input that a match has been made adjacent one or more of said game objects of the first type; causing by said at least one processor, in response to said determining, said at least one game object of the first type adjacent that match to move one or a plurality of positions on said game board and providing of at least one game object of said second type.

In some embodiments, the at least one game object of the second type may be only be provided in response to a match adjacent said game object of the first type.

In some embodiments, said game board is associated with an objective, said objective being to collect said at least one game object of the second type provided in response to said match adjacent the game object of the first type.

In some embodiments, the method may comprise collecting said at least one game object of the second type provided in response to said match by forming a matching comprising a plurality of such game objects.

The moving of said at least one game object a plurality of positions on said game board may cause removal of respective game objects located at those positions.

According to an aspect, there is provided a computer device providing a computer implemented game, said device having: at least one processor; at least one memory; a display; and a user interface, wherein said at least one processor is configured to: cause a display on said display of a game board, said game board comprising a least one game object of a first type and a plurality of game objects of a second type, said game objects of said second type having one of a plurality of different available characteristics; detect first user input via the user interface when a user engages with one of said game objects; determine in response to said detected first input that a match has been made adjacent one or more of said game objects of the first type; causing, in response to said determining, said at least one game object of the first type adjacent that match to move one or a plurality of positions on said game board and providing of at least one game object of said second type.

According to another aspect, there is provided a non-transitory computer readable storage device storing instructions that, when executed by at least one processor of a computer device causes said at least one processor to perform the following steps: cause a display on said display of a game board, said game board comprising a least one game object of a first type and a plurality of game objects of a second type, said game objects of said second type having one of a plurality of different available characteristics; detect first user input via the user interface when a user engages with one of said game objects; determine in response to said detected first input that a match has been made adjacent one or more of said game objects of the first type; causing, in response to said determining, said at least one game object of the first type adjacent that match to move one or a plurality of positions on said game board and providing of at least one game object of said second type.

According to another aspect, there is provided a computer implemented method performed by a computer device to provide a computer implemented game, the computer device having at least one processor, at least one memory, a display, and a user interface, the method comprising: causing by said at least one processor display on said display of a game board, said game board comprising at least one game object of a first type and a plurality of game objects of a second type, said game objects of said second type having one of a plurality of different available characteristics and said game objects of said first type having a first state in which a game object of the second type overlies said first object and a second state in which no game object of the second type overlies said first object; detecting first user input via the user interface when a user engages with one of said game objects; determining by said at least one processor in response to said detected first input that a first match has been made with a plurality of second objects, at least one of which is overlies a first object in a first state; updating by said at least one processor a state of said first object involved in said first match to said second state; detecting second user input via the user interface when the user engages with one of said game objects; determining by said at least one processor in response to said detected second input that a second match has been made with a plurality of second objects, at least one of which adjacent one or more of said game objects of the first type in the second state; and updating by said at least one processor the state of said first object involved in said second match from the second state to the first state.

According to an aspect, there is provided a computer device providing a computer implemented game, said device having: at least one processor; at least one memory; a display; and a user interface, wherein said at least one processor is configured to: cause display on said display of a game board, said game board comprising at least one game object of a first type and a plurality of game objects of a second type, said game objects of said second type having one of a plurality of different available characteristics and said game objects of said first type having a first state in which a game object of the second type overlies said first object and a second state in which no game object of the second type overlies said first object; detect first user input via the user interface when a user engages with one of said game objects; determine in response to said detected first input that a first match has been made with a plurality of second objects, at least one of which is overlies a first object in a first state; update a state of said first object involved in said first match to said second state; detect second user input via the user interface when the user engages with one of said game objects; determine by said at least one processor in response to said detected second input that a second match has been made with a plurality of second objects, at least one of which is adjacent one or more of said game objects of the first type in the second state; and update the state of said first object involved in said second match from the second state to the first state.

According to another aspect, there is provided a non-transitory computer readable storage device storing instructions that, when executed by at least one processor of a computer device causes said at least one processor to perform the following steps: cause display on said display of a game board, said game board comprising at least one game object of a first type and a plurality of game objects of a second type, said game objects of said second type having one of a plurality of different available characteristics and said game objects of said first type having a first state in which a game object of the second type overlies said first object and a second state in which no game object of the second type overlies said first object; detect first user input via the user interface when a user engages with one of said game objects; determine in response to said detected first input that a first match has been made with a plurality of second objects, at least one of which is overlies a first object in a first state; update a state of said first object involved in said first match to said second state; detect second user input via the user interface when the user engages with one of said game objects; determine by said at least one processor in response to said detected second input that a second match has been made with a plurality of second objects, at least one of which is adjacent one or more of said game objects of the first type in the second state; and update the state of said first object involved in said second match from the second state to the first state.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 8b shows an enlargement of part of the game board of FIG. 8a.

DETAILED DESCRIPTION OF SOME EMBODIMENTS

Figure 1:
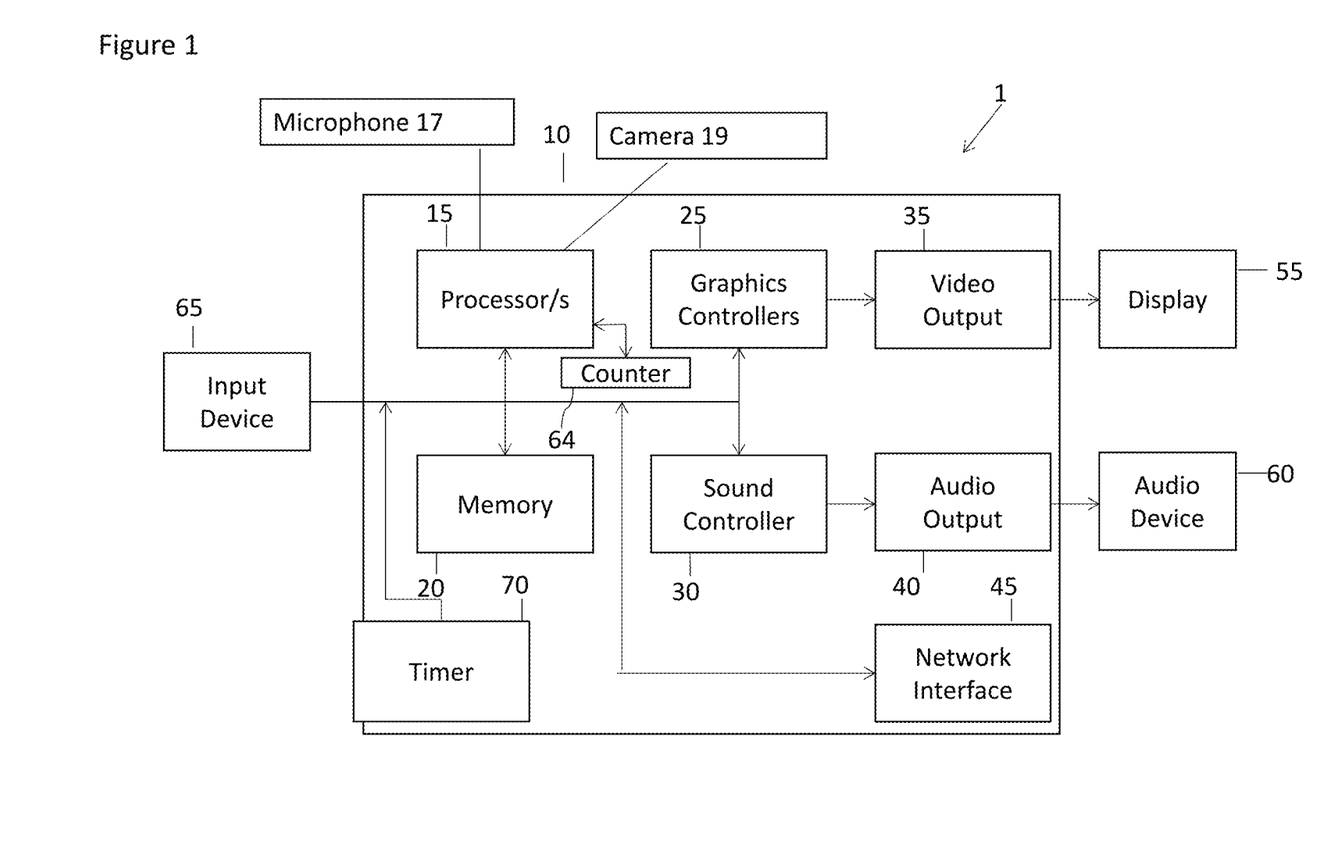
FIG. 1 shows an example user device in which some embodiments may be provided.

A schematic view of a user device 1 according to an embodiment is shown in FIG. 1. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional is some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional is some embodiments The control part 10 has an interface 45 allowing the device to be able to communicate with a network such as the Internet or other communication infrastructure. The control part 10 may have a timer 70 or similar configured to provide timing information to the at least one processor 15 or memory 20. The timer may be implemented in hardware, software or by a combination of hardware and software.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

Figure 2:
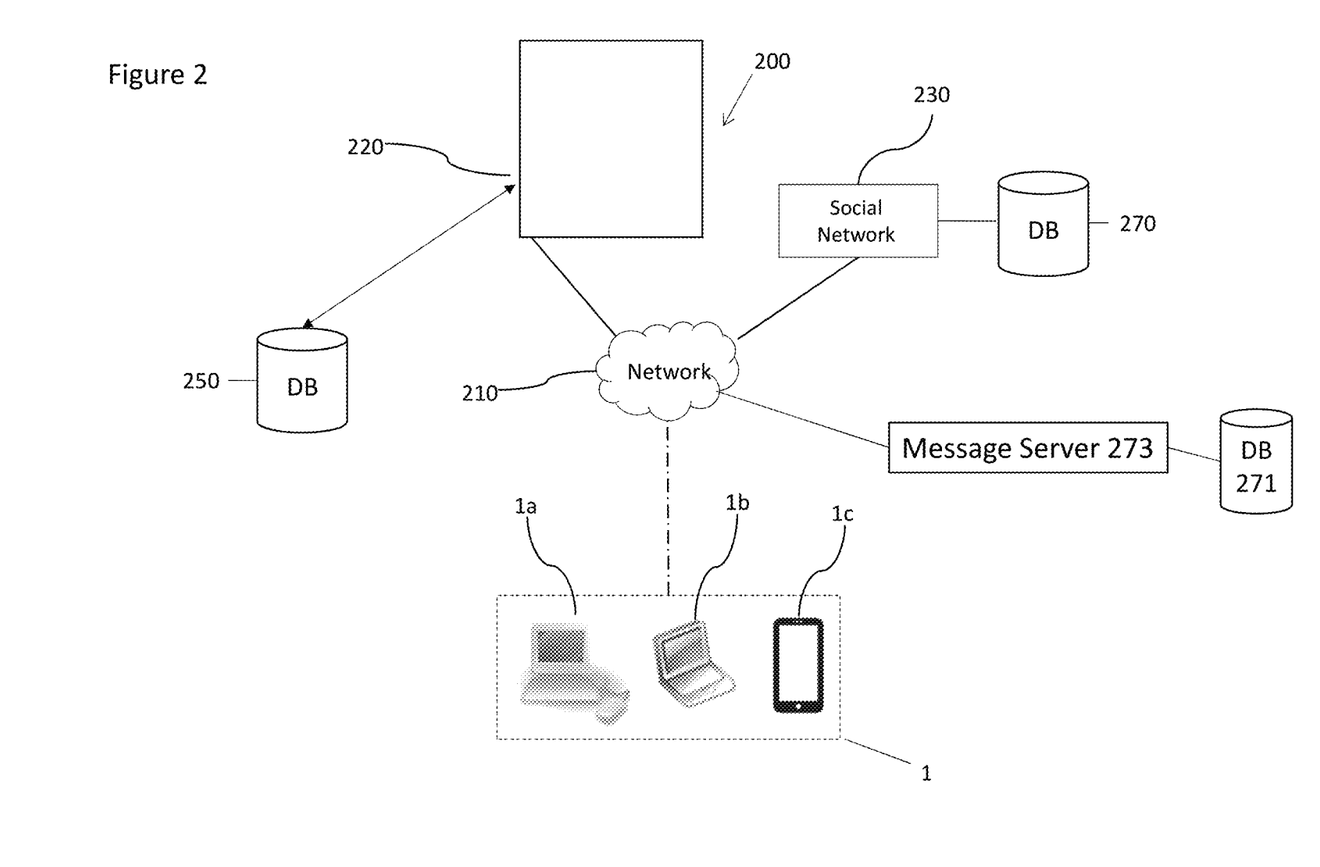
FIG. 2 shows an example system in which some embodiments may be provided.

FIG. 2 schematically shows a system 200 according to an embodiment. The system 200 comprises a computer game infrastructure comprising a computer game server 220 which may store or be in communication with database 250. The database may have game player's details, profiles, statistics etc. In practice, one or more databases 250 may be provided. In practice, one or more computer game servers 220 may be provided. Where one or more computer game server is provided, the database(s) 250 may be provided in one database 250 across two or more servers.

The computer game server 220 may communicate via, for instance, the internet 210 to one or more client or user devices 1, shown in FIG. 1 by way of example as user devices 1a, 1b and 1c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 1.

A separate message infrastructure is provided to support a messaging application. This infrastructure may comprise a message server 273 and one or more databases 271. A user device supporting the messaging application will communicate with another user device supporting the messaging application via the message infrastructure and the network. The message infrastructure may be separate from the computer game infrastructure in some embodiments. In other embodiments, the message infrastructure and the computer game infrastructure may comprise one or more common parts.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices 305.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

Some embodiments may be implemented to synchronize game state information and/or retrieve and connect to social graph information and user profile data on a social network such as Facebook or Google+.

Some embodiments may be implemented to enable connection to a plurality of social networks. The user may be given the option to select which information may be derived and/or shared with which social network.

Figure 3:
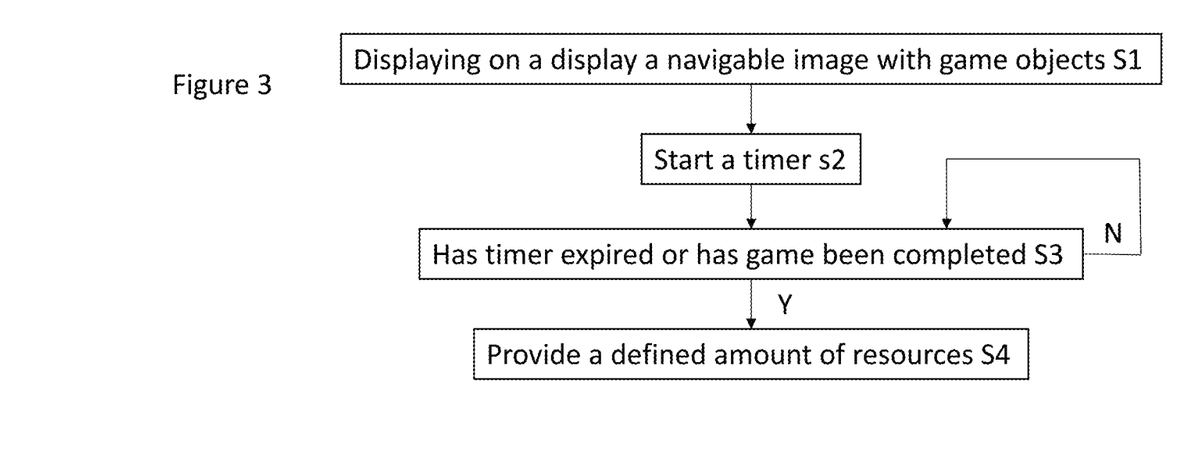
FIG. 3 shows a first method of an embodiment.

Reference is made to FIG. 3 which shows a method of an embodiment.

In step S1, a navigable image with game objects is displayed.

Figure 4:
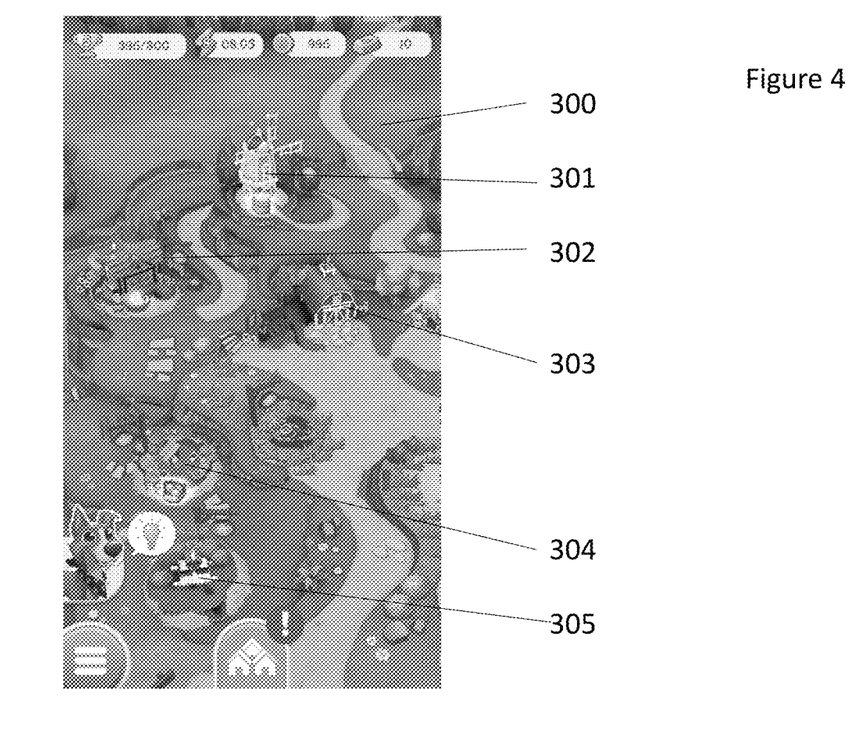
FIG. 4 shows a navigable image displayed on a display of the device.

By way of example, reference is made to FIG. 4 which shows an example of such a navigable image. In this example, the navigable image 300 represents a farm. However, this is by way of example only and the image could represent a village, a town, a country, a shop, a restaurant, a planet, a fair or any other entity. In this example the game objects are a windmill 301, a cow shed 302, a hen house 304 and a bee hive 306.

Referring back to FIG. 3, a timer is started. In some embodiments, all of the game objects have a common timer defining a common time for all the game objects. In other embodiments, a different timer may be associated with each of the game objects of FIG. 4. In other embodiments, a different time may be associated with each of the game objects, this being supported by a common timer. In some embodiments two or more game objects may have a common time and one or more other game objects may have a different time. This may be supported by a common timer, different timers or a combination of the two.

The timer may be a count up timer or a countdown timer. The timer may be implemented by hardware, software or a combination of hardware and software.

In step S3 it is determined if the timer has expired or if a game has been completed. In some embodiments, this which will be to see if a given time has elapsed and may not require a timer to expire. If not, the method will loop to repeat step S3.

In some embodiments, instead of repeating the check until one of the two conditions as occurred, the method will instead wait until the condition (either the timer has expired or the game has been completed) and information indicating the satisfying of one of the conditions has been received.

In step S4, which occurs when the timer has expired or the game has been completed, a defined amount of resources will provided. In the context of the example shown in FIG. 4, the game resources will comprise flour from the windmill, milk from the cowshed, eggs from the hen house and honey from the bee hive.

In some embodiments, the amount of game resources may be an integer number of resources. In other embodiments, the amount of game resources may be have a fractional part of a complete game resource.

In some embodiments, the amount of game resources may be different for different ones of the game objects.

In the embodiments, shown in FIG. 4, one of the game objects 303, is configured to store collected game resources. In this example, that game object is represented by a barn.

Figure 5:
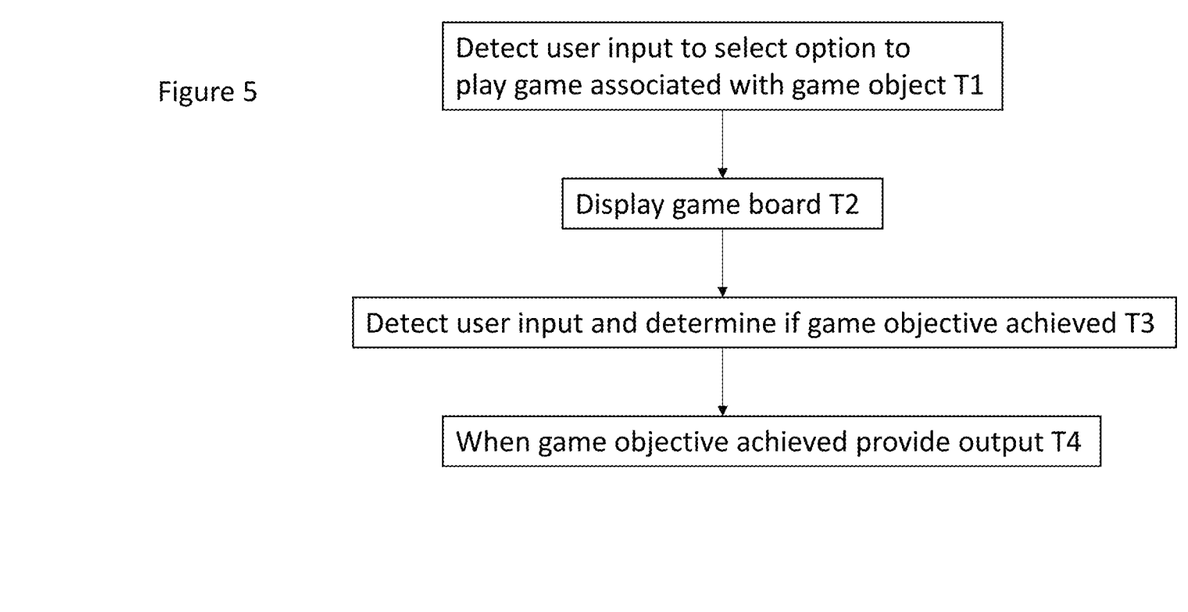
FIG. 5 shows a second method of an embodiment.

Reference is made to FIG. 5 which shows the method associated with the playing of a game. This will be described in conjunction with FIGS. 6a to d which show example images which are displayed during the method of FIG. 5. As mentioned, a player will receive a given amount of resources after a given amount of time. By playing one or more games and satisfying one or more objectives, a player is able to speed up the providing of the resources.

In step T1, at least one processor is configured to detect user input via the user interface to select a game option to play a game associated with a game object.

Figures 6A, 6B:
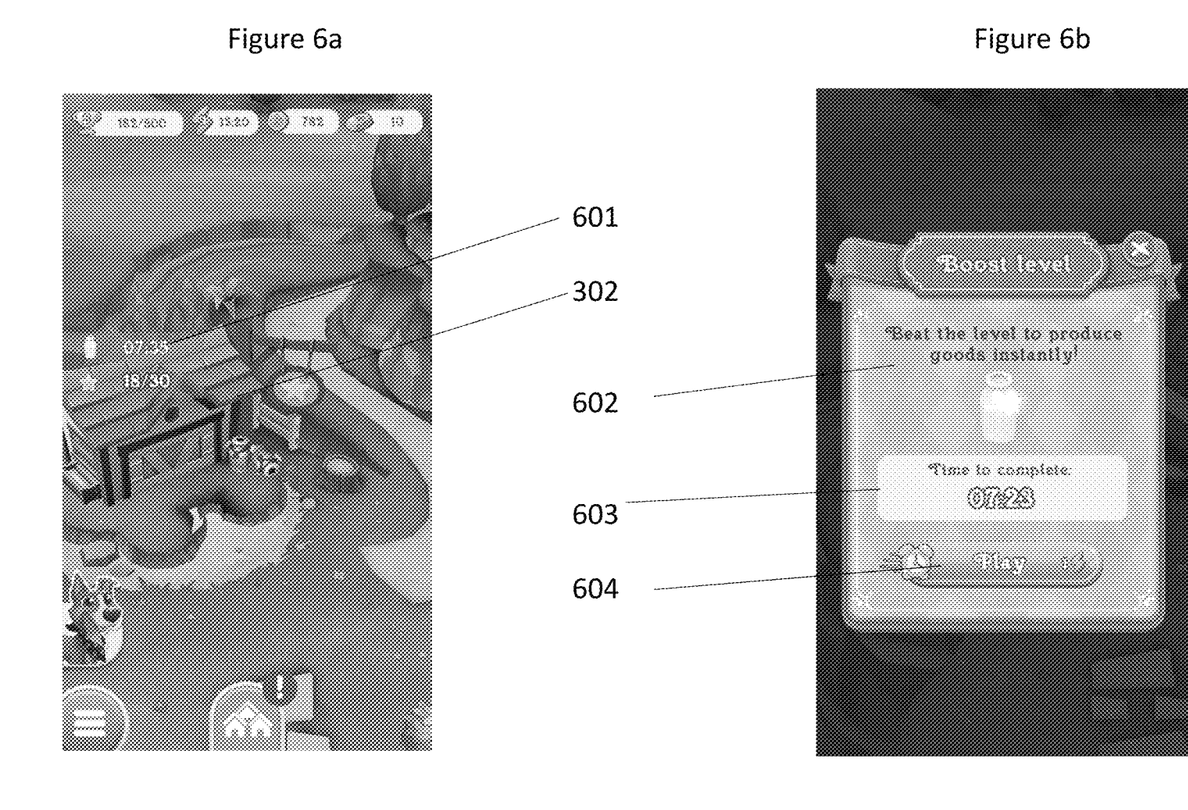
FIGS. 6a to 6d schematically images displayed on the display associated with obtaining resources.

In this regard, reference is made to FIG. 6a which shows one of the game objects, in this example the cowshed 302. As referenced 601, the amount of time until the defined number of resources is provided is shown. In this example, the time until the defined number of resources will be provided is displayed.

When the user interacts with the game object via the user interface, the image shown in FIG. 6b is shown. This is shows an invitation 602 to the user to play the game. Also shown is the remaining time 603 until the resources would be provided as a result of the given amount of time elapsing. Finally, an area 604 is provided which if the user interacts with this area via the user interface, the game will be played. For example the user input via the user interface may be to click on this area 604.

In step T2, a game board is displayed. It should be appreciated that in other embodiments, the game which needs to be played by the user may not require a game board. In those embodiments a game area is provided and the images necessary for the user to play that game is displayed.

Figure 6C:
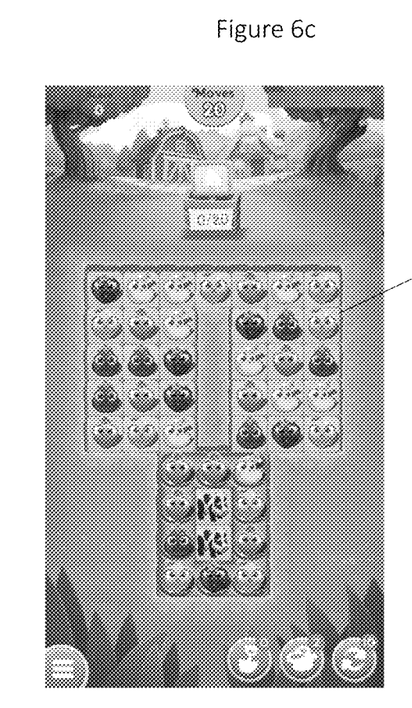
Figure 6D:
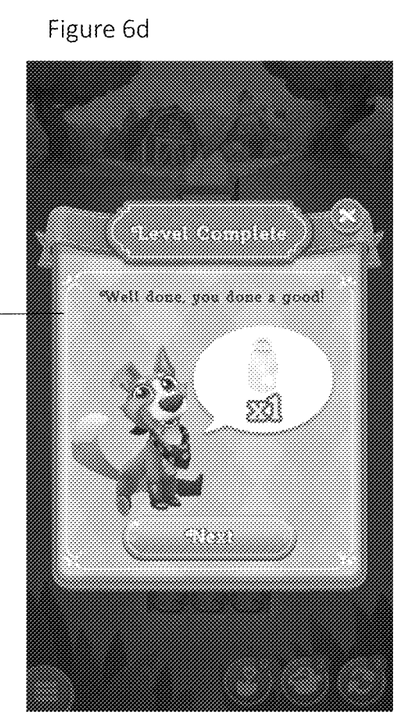

In this regard, reference is made to FIG. 6c which shows an example game board 610 of some embodiments. The game board is associated with a game. The user will interact with the game board to make moves. There will be rules associated with the moves which the user can make. There may be a limited number of moves. The game board will be associated with a game objective.

In step T3, the moves made by the user will be detected and the game logic will determine if the moves made by the user result in the game objective being satisfied.

In step T4, when it is determined that the game objective is satisfied an output is provided. This output may for example be used to cause the image 611 of FIG. 6d to be displayed. This will convey information to the user that the level has been completed and that the user will receive the desired resources.

In some embodiments, the successful completion of a game objective will cause the remaining amount of time required to produce the resources to be reduced to a lower amount of time. This amount of time reduction will be an amount greater than the amount of time required to play the game.

In some embodiments, the timer will run during the playing of a game. When the game is completed, the timer may be adjusted if the objective associated with the game has been completed. This adjustment may be to reset the timer and provide the resources or to reduce the remaining amount of timer required to produce the resources.

The output may alternatively or additionally be used to cause the game logic to reset the timer or adjust the timer.

The output may alternatively or additionally be used to cause the game logic to cause the game resources may be made available to the user.

It should be appreciated that if the user is unsuccessful, the timer continues to run and is only reset or adjusted if the user is successful.

It should be appreciated that in some embodiments, there may be a single objective to be satisfied. This may for example be the successful completion of a game where the one or more game objectives have been satisfied. In other embodiments, there may be a plurality of objectives to be satisfied. This may require the completion of a plurality of games where the one or more game objectives have each been satisfied.

In some embodiments one or more game objects may have a plurality of different levels. The level of the game object may control the amount of an associated resource which is provided and/or the time taken to produce the associated amount of resource.

In some embodiments, the user is able to upgrade a level. This may require the user to play one or more games. There may be a single objective to be satisfied. This may for example be the successful completion of a game where the one or more game objectives have been satisfied. In other embodiments, there may be a plurality of objectives to be satisfied. This may require the completion of a plurality of games where the one or more game objectives have each been satisfied. The games may be a similar type to those used to obtain resources more quickly and/or can be of a different type.

In other embodiments, the level of the object can be upgraded in any suitable manner, for example using in game currency, after the collecting of a certain number of resource or the like.

In some embodiments, a player of a game is required to "collect" the resources. By way of example only, this may require the player to click on the resources via the user interface. Alternative ways of collecting the resources may alternatively or additionally be provided. In some embodiments, the collected resources may be stored or otherwise associated with another game object. This may be the barn game object 303, as shown in FIG. 4.

In some embodiments, there may be a limit on the number of uncollected resources associated with a game object. Different game objects may have different limits. If the number of resources has reached the limit, the timer functionality may not be enabled. In other embodiments, where the number of uncollected resources has reached the limit, the timer functionality continues to operate but no additional resources are provided when the timer expires.

In other embodiments, a user may be automatically be provided with the resources without the need for the user to collect the produced resources.

Figure 7A:
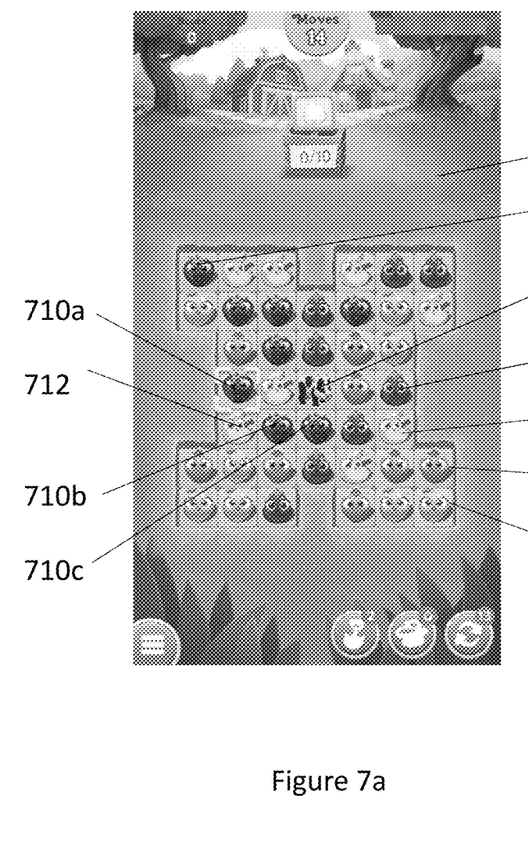
FIGS. 7a and 7b schematically show a further example of a game board of some embodiments.
Figure 7B:
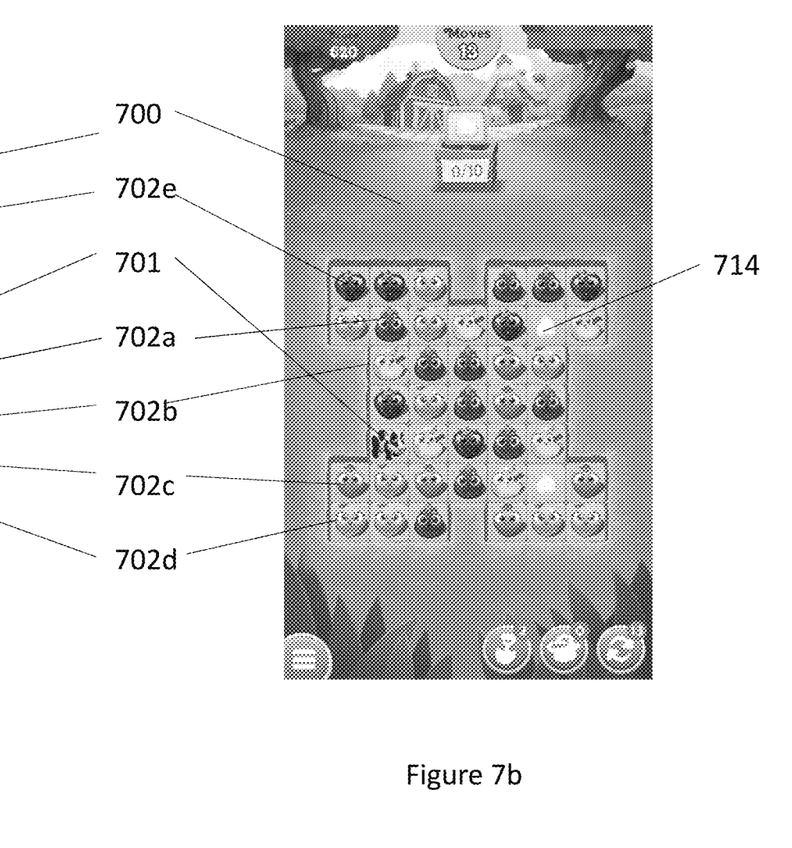

Reference is made to FIGS. 7a and 7b which show one example game board 700 and game objective provided in some embodiments. In this example, the game board comprises a first type of object 701. In the example shown in FIGS. 7a and 7b, the first type of object is shown as a cow. However, it should be appreciated that in different embodiments, different graphical representations may be used for the first type of object. In this example, there is only one of this first type of object. However, in other embodiments, there may be more than one of this first type of object. Where there is more than one first type of object, they may be the same or differ.

The game board has a plurality of second types of objects 702. The second type of objects which have one of a plurality of different characteristics. This different characteristics may be comprise one or more of different shapes and/or colours. In the example shown in FIGS. 7a and 7b, there are five different ones of the second types of object 702a, 702b, 702c, 702d and 702e. These are represented as vegetables/fruits in this example, with aubergines 702a, bananas 702b, carrots 702c, apples 702d and strawberries 702e. It should be appreciated that the specific representations of the different types of second object are by way of example only. In this example, there are five different second types of object. In other embodiments, there may be more or less than the five different second types of object.

The example game board is for a match three type game. In this example game, a user is able to select via the user interface one second type of game object and switch it with another second type of game object. In some embodiments, the user is able to switch the selected second type of game object with the first type of game object. The at least one processor is configured to make a determination that a match condition is satisfied. This at least one processor may determine from detected user input via the user interface which game object(s) have been selected and the associated positions occupied by the respective game objects. The at least one processor may be configured to identify that a valid match condition has been satisfied as a result of the detected user input. Game logic may define the conditions which need to be satisfied in order for there to be a valid match.

The at least one processor is configured to determine if the switch will result in a valid match and to permit the switch only if there is a valid match. In the example, shown in FIGS. 7a and 7b, the aim is to make a match adjacent the first object. In the FIG. 7a, the game object which is selected by the user is referenced 710a and this game object is switched with the game object referenced 712. Thus a match is made with three game objects 710a, 710b and 710c. These game objects satisfy the criteria for a valid match—they are in a line, there are at least 3 game objects, and the game objects are of the same one of the second type of game objects. In this example, the three game objects are strawberries.

In this example match, a match is made adjacent the first object. When a match is made, the matching game objects are removed. Further when a match is made adjacent the first game object, one or more of a third type 714 of a game object are provided. Alternatively or additionally the first game object, which is adjacent to the match will move.

In embodiments, the first game object may be controlled to move between x and y steps. Each step represents moving from one game object position to the next. As the first game object moves from one game object position to the next, the game object occupying that position is removed from the game board.

The number of steps may be a constant number of steps or may be vary between moves.

In some embodiments, the number of steps moved may depend on the type of match made adjacent the first object. For example, the more game objects in the match, the more steps taken by the first object. In other embodiments, the number of steps taken may be independent of the number of game objects in the match.

In some embodiments, the path taken by the first object may be random. In other embodiments, the path taken may be one of a predefined number of available paths. In some embodiments, the path taken may be dependent on the location of the matching game objects with respect to the first game object. In some embodiments the path taken may be dependent on the game object associated with a game position. For example, the path may avoid one or more of third objects and other of the first type of objects. The path may alternatively or additionally be dependent on which of the different second type of objects is associated with a particular position.

It should be appreciated that the path taken by the first object is not the same as the behaviour of the second game objects which will move to replenish positions on the game board in one or more directions defined by the tile physics. In some embodiments, the first object will not move while the game board is being replenished.

In other embodiments, the path may be independent of which game object is associated with a particular game object position.

The one or more third game objects may be collected by a user to achieve a game objective. In this example, the third game object 714 is represented by milk. The third game objects may be collected in any suitable way. For example, the third game objects may be collected by making a valid match with three or more of the third type of game objects. In some embodiments, the third game objects may be regarded as second game objects. In this scenario, the third game objects may comprise a visual distinct second object. The movement and behaviour of the third game object may be the same as the other second game objects.

In some embodiments, there may be one or more different types of the third object. In the example of FIGS. 7a and 7b, there is only one third type of game object.

It should be appreciated that when a new match is made adjacent the first game object one or more further third game object may be added to the game board. In some embodiments, alternatively or additionally, one or more of the third game objects may have a value associated therewith increased. For example the value of a third game object may be incremented from 1 to 2. This means, that when that particular game object is collected, that game object will equate to two separate game objects having been collected.

The provision of the three different types of game objects as discussed previously is able to improve user engagement. For example, the moving of the first object to remove game objects means that at the end of a turn, there may be a quite a few changes to the game board, making the game more challenging and engaging despite a limited screen resource.

Figure 8A:
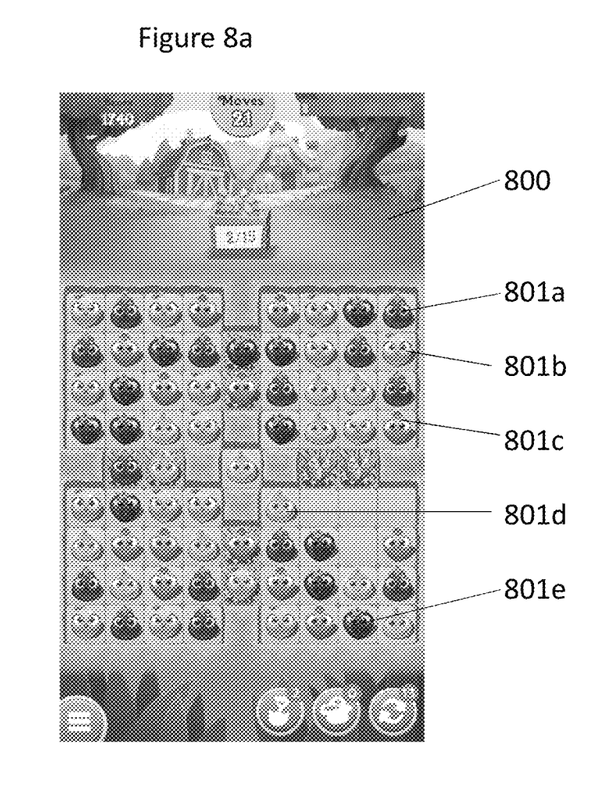
FIG. 8a schematically shows the another example of a game board of some embodiments.
Figure 8B:
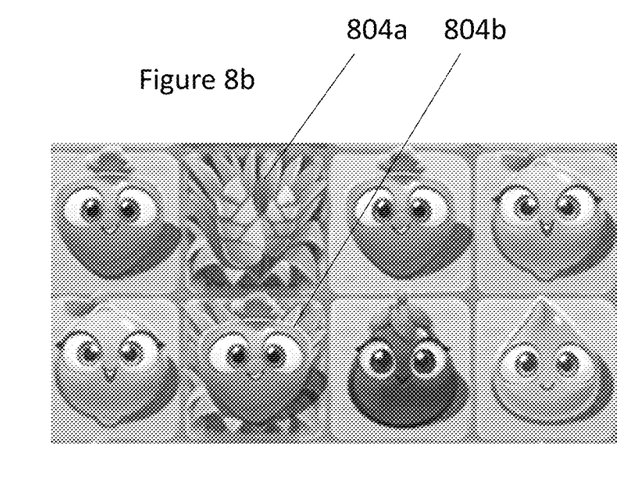

Reference is made to FIGS. 8a and 8b which shows another example of a game board 800. This example has game objects 801a toe of a similar type to the second type of game objects of FIGS. 7a and 7b. In this example there are aubergines 801a, apples 801b, carrots 801c, water drops 801d and strawberries 801e used to represent the different types of game object.

The game board, as more clearly shown in FIG. 8b has on some of tiles of the game board a fourth game object 804. (The first and third game objects may be omitted from this game board although one or other or both of the first and third game objects may be used in a game board having the fourth game objects). This fourth game object has a first state where the second type of game objects are able to overlie the fourth game object. This first state is reference 804b. If a match is made with a second type of game object overlying the fourth game object, then that second type of game object may be removed. In some embodiments, a similar criteria to that described above may be used to determine if there is a valid match.

The fourth game object may then have a second state in which the fourth game object is shown in a different manner to when in the first state. The fourth game object in the second state is referenced 804a in FIG. 8b. In some embodiments, the fourth game object may be visually represented as wheat but this is by way of example only. When the fourth object is in the second state, it is not possible for the second type of game objects to overlie the fourth game object.

If a match is made adjacent the fourth object when in the second state, the fourth object may revert to the first state. The fourth object may be "collected". In some embodiments, it may be an objective to collect a given amount of the item represented by the fourth object.

In some embodiments, it may be necessary to make a plurality of matches adjacent the fourth object when in the second state in order to "collect" the fourth object. These different sub states of the second state may in some embodiments be represented in a visually distinct manner. In other embodiments, there may be no such visual distinctions between sub states of the second state.

The above example games have discussed the removal of game elements from the game boards. A refilling mechanism may be used in some embodiments.

It should be appreciated that the casual game used in some embodiments can be any other suitable game. For example, the game may be so called 'clicker' game where the player can click on a group of adjacent game elements of a certain type and those will then be removed. Some clicker games only require two adjacent objects to remove those elements if clicked by the user. Others may require more than two.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer implemented method performed by a computer device to provide a computer implemented game, the computer device having at least one processor, at least one memory, a display, and a user interface, the method comprising:
   causing, by said at least one processor, display of a navigable image on said display, said navigable image comprising a plurality of game objects of said computer implemented game;
   generating, by said at least one processor, game resources for said computer implemented game, said game resources being associated with at least one of said game objects, wherein a given amount of said game resources are provided in a respective time period defined by a timer;
   detecting first user input from a user, via the user interface, interacting with one of said game objects of said computer implemented game;
   causing by said at least one processor, in response to said detected first user input, display on said display of a game area, said game area allowing a first computer implemented game to be playable within said computer implemented game, said first computer implemented game having a game objective to be satisfied in order to complete said first computer implemented game;
   detecting second user input from the user, via the user interface, interacting with said game area to play said first computer implemented game, said second user input defining one or more moves in said first computer implemented game;
   responsive to said detected second user input defining the one or more moves in said first computer implemented game, determining by said at least one processor that the game objective associated with said first computer implemented game is satisfied, said game objective being satisfied by playing the first computer implemented game;
   adjusting the timer, responsive to determining that the game objective associated with the first computer implemented game is satisfied, such that a remaining amount of time of the time period defined by the timer required to provide said given amount of same resources for said computer implemented game is reduced;
   causing the timer to run with the reduced remaining time; and
   subsequently when the reduced remaining time of the time period defined by the timer has expired, providing by said at least one processor said given amount of said game resources for use in said computer implemented game.

2. The method as claimed in claim 1, comprising causing, by said at least one processor, a game board to be displayed in said game area, said game board comprising a plurality of game elements selectable via said user interface.

3. The method as claimed in claim 1, comprising detecting third user input via the user interface to select an upgrade mode associated with one of said game objects.

4. The method as claimed in claim 3, comprising in response to said detected third user input causing, by the at least one processor, a game board to be displayed by said display, said game board comprising a plurality of game elements selectable via said user interface.

5. The method as claimed in claim 4, comprising detecting fourth user input via said user interface to select one or more of said game elements to play a game associated with said game board, and responsive to said fourth user input determining by said processor if a game objective associated with said game board has been satisfied and if so upgrading said game object.

6. The method as claimed in claim 3, wherein when said game object has been upgraded, the respective time period to produce the respective amount of resources is reduced.

7. The method as claimed in claim 3, wherein when said game object has been upgraded, the respective amount of resources produced in said respective time period is increased.

8. The method as claimed in claim 1, wherein at least one game object has a plurality of different levels, each level being associated with a respective time period to produce a respective amount of resources, at least one of the respective time period and the respective amount of resources being dependent on the level.

9. The method as claimed in claim 1, wherein said timer is one of a count up and a countdown timer.

10. The method as claimed in claim 1, comprising determining by said at least one processor if a limit amount of said resources are waiting for collection during game play and if so, waiting until an amount of resources waiting for collection is less than the limit amount before causing by the at least one processor, the generation of more of said resources.

11. The method as claimed in claim 1, wherein when a game objective associated with said first game has been not been satisfied, then the timer continues to run until said timer expires or said game objective associated with said first game has been satisfied.

12. The method as claimed in claim 1, wherein determining by said at least one processor that the game objective associated with said first computer implemented game is satisfied comprises determining that said one or more moves in the first computer implemented game causes the game objective to be satisfied.

13. A non-transitory computer readable storage device storing instructions that, when executed by at least one processor of a computer device causes said at least one processor to perform the following steps:
   causing display of a navigable image on said display, said navigable image comprising a plurality of game objects of a computer implemented game;
   generating game resources for said computer implemented game, said game resources being associated with at least one of said game objects, wherein a given amount of said game resources are provided in a respective time period defined by a timer;
   detecting first user input from a user, via the user interface, interacting with one of said game objects of said computer implemented game;
   causing in response to said detected first user input, display on said display of a game area, said game area allowing a first computer implemented game to be playable within said computer implemented game, said first computer implemented game having a game objective to be satisfied in order to complete said first computer implemented game;

detecting second user input from the user, via the user interface, interacting with said game area to play said first computer implemented game, said second user input defining one or more moves in said first computer implemented game;

responsive to said detected second user input defining the one or more moves in said first computer implemented game, determining that the game objective associated with said first computer implemented game is satisfied, said game objective being satisfied by playing the first computer implemented game;

adjusting the timer, responsive to determining that the game objective associated with the first computer implemented game is satisfied such that a remaining amount of time of the time period defined by the timer required to provide said given amount of same resources for said computer implemented game is reduced;

causing the timer to run with the reduced remaining time; and subsequently when the reduced remaining time of the time period defined by the timer has expired, providing said given amount of said game resources for use in said computer implemented game.

14. A computer device providing a computer implemented game, said device having:
   at least one processor;
   at least one memory;
   a display; and
   a user interface,
   wherein said at least one processor is configured to:
   cause, display of a navigable image on said display, said navigable image comprising a plurality of game objects of a computer implemented game;
   generate game resources for said computer implemented game, said game resources being associated with at least one of said game objects, wherein a given amount of said game resources are provided in a respective time period defined by a timer;
   detect first user input from a user, via the user interface, interacting with one of said game objects of said computer implemented game;
   cause, in response to said detected first user input, display on said display of a game area, said game area allowing a first computer implemented game to be playable within said computer implemented game, said first computer implemented game having a game objective to be satisfied in order to complete said first computer implemented game;
   detect second user input from the user, via the user interface, interacting with said game area to play said first computer implemented game, said second user input defining one or more moves in said first computer implemented game;
   responsive to said detected second user input defining the one or more moves in said first computer implemented game, determine if the game objective associated with said first computer implemented game has been satisfied, said game objective being satisfied by playing the first computer implemented game;
   adjust the timer, responsive to determining that the game objective associated with the first computer implemented game is satisfied, such that a remaining amount of time of the time period defined by the timer required to provide said given amount of same resources for said computer implemented game is reduced;
   cause the timer to run with the reduced remaining time; and
   subsequently when the reduced remaining time of the time period defined by the timer has expired, providing said given amount of said game resources for use in said computer implemented game.

15. The computer device as claimed in claim 14, wherein the at least one processor is configured to cause a game board to be displayed in said game area, said game board comprising a plurality of game elements selectable via said user interface.

16. The computer device as claimed in claim 14, wherein the at least one processor is configured, to detect third user input via the user interface to select an upgrade mode associated with one of said game objects.

17. The computer device as claimed in claim 16, wherein the at least one processor is configured, in response to said detected third user input, to cause a game board to be displayed by said display, said game board comprising a plurality of game elements selectable via said user interface.

18. The computer device as claimed in claim 17, wherein the at least one processor is configured to detect fourth user input via said user interface to select one or more of said game elements to play a game associated with said game board, and responsive to said fourth user input determine if a game objective associated with said game board has been satisfied and if so upgrading said game object.

19. The computer device as claimed in claim 16, wherein when said game object has been upgraded, the respective time period to produce the respective amount of resources is reduced.

20. The computer device as claimed in claim 16, wherein when said game object has been upgraded, the respective amount of resources produced in said respective time period is increased.

21. The computer device as claimed in claim 14, wherein at least one game object has a plurality of different levels, each level being associated with a respective time period to produce a respective amount of resources, at least one of the respective time period and the respective amount of resources being dependent on the level.

22. The computer device as claimed in claim 14, wherein said timer is one of a count up and a countdown timer.

23. The computer device as claimed in claim 14, wherein the at least one processor is configured to determine if a limit amount of said resources are waiting for collection during game play and if so, waiting until an amount of resources waiting for collection is less than the limit amount before causing the generation of more of said resources.

24. The computer device as claimed in claim 14, wherein when a game objective associated with said first computer implemented game has been not been satisfied, then the timer continues to run until said timer expires or said game objective associated with said first game has been satisfied.

25. The computer device as claimed in claim 14, wherein said at least one processor is configured to determine that the game objective associated with said first computer implemented game is satisfied by determining that said one or more moves in the first computer implemented game causes the game objective to be satisfied.

* * * * *